United States Patent [19]

Shepherd et al.

[11] Patent Number: 5,753,987
[45] Date of Patent: May 19, 1998

[54] GENERATOR APPARATUS COUPLED TO SIDE FRAME OF VEHICLE AND ENERGIZED BY ROTATION OF AXLE ON VEHICLE

[75] Inventors: Robert W. Shepherd, Pelzer; Mark Michel, Greer, both of S.C.

[73] Assignee: Ellcon National, Inc., Greenville, S.C.

[21] Appl. No.: 738,886

[22] Filed: Oct. 28, 1996

[51] Int. Cl.⁶ .................. H02K 7/10; H02K 7/14; B61D 43/00
[52] U.S. Cl. .................. 310/75 R; 310/67 R; 105/96.1
[58] Field of Search .................. 310/67 R, 75 R, 310/75 C, 75 D; 105/96.1, 131

[56] References Cited

U.S. PATENT DOCUMENTS

| | | | |
|---|---|---|---|
| 2,292,533 | 8/1942 | Maltman | 105/96.1 |
| 2,313,916 | 3/1943 | Bone et al. | 105/96.1 |
| 2,422,946 | 6/1947 | Brittain, Jr. | 105/96.1 |
| 2,903,973 | 9/1959 | Lewis | 105/96.1 |
| 3,201,623 | 8/1965 | Allport | 310/75 R |
| 3,596,122 | 7/1971 | Stewart | 310/67 R |
| 4,377,975 | 3/1983 | Scott et al. | 105/96.1 |
| 5,440,184 | 8/1995 | Samy et al. | 310/90 |
| 5,585,711 | 12/1996 | Kemner et al. | 322/46 |

FOREIGN PATENT DOCUMENTS

| | | | |
|---|---|---|---|
| 449538A1 | 10/1991 | European Pat. Off. | H02K 21/14 |
| 2254154 | 9/1992 | United Kingdom | B61K 9/06 |

*Primary Examiner*—Clayton E. LaBalle
*Attorney, Agent, or Firm*—Brooks Haidt Haffner & Delahunty

[57] ABSTRACT

A vehicle axle driven electrical generator assembly for supplying electrical power to electrically operable vehicle brakes, the generator having a magnetic field producing rotor and a stator with conductors in the magnetic field. The rotor has its axis of rotation coaxial with the axis of rotation of the axle and is rotated by a drive shaft which is either secured to the end of the axle or is loosely coupled to the end of the axle. The rotor and the stator are encircled by a housing to which the stator is secured and the housing is restrained with respect to rotation by either a link acting between the housing and a fixed portion of the vehicle or by securing the housing to the fixed portion.

25 Claims, 9 Drawing Sheets

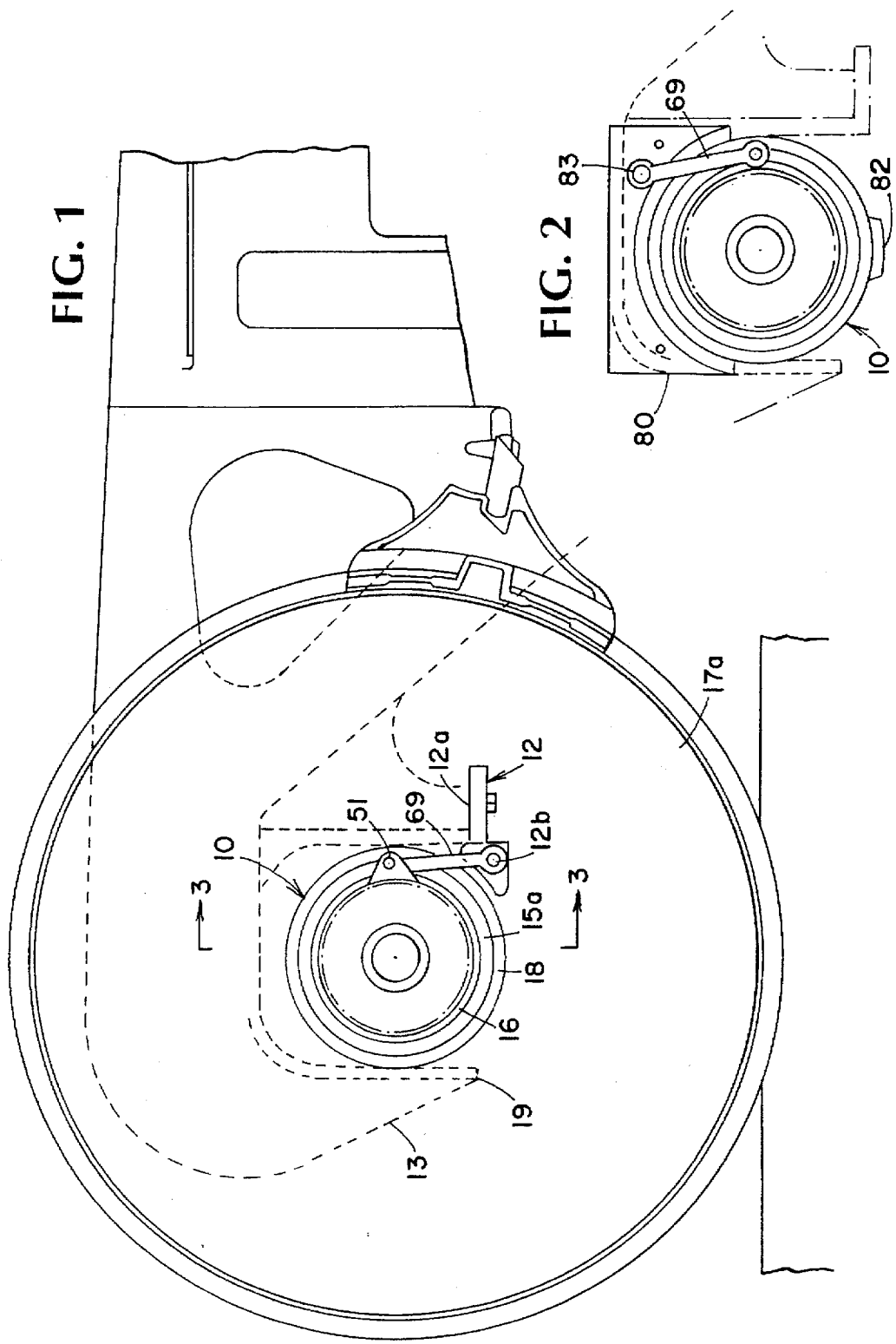

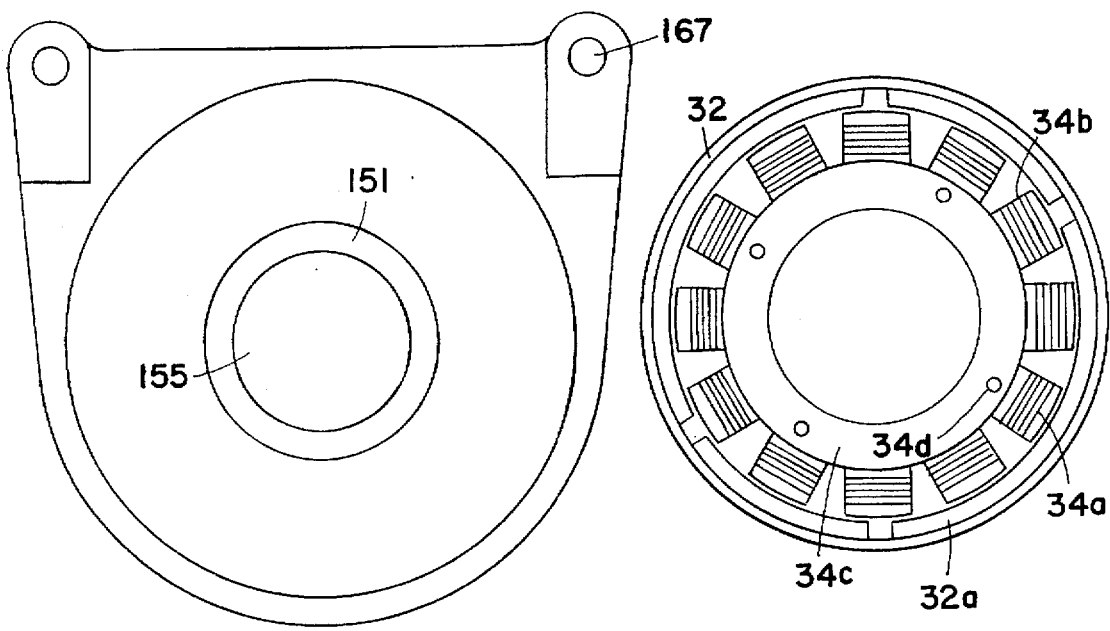
FIG. 14   FIG. 15
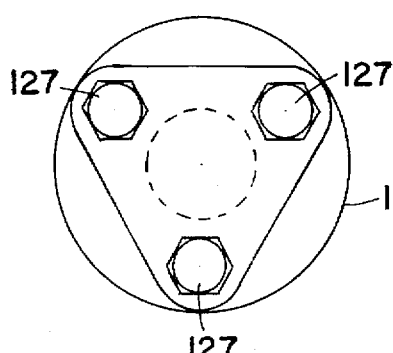
FIG. 16
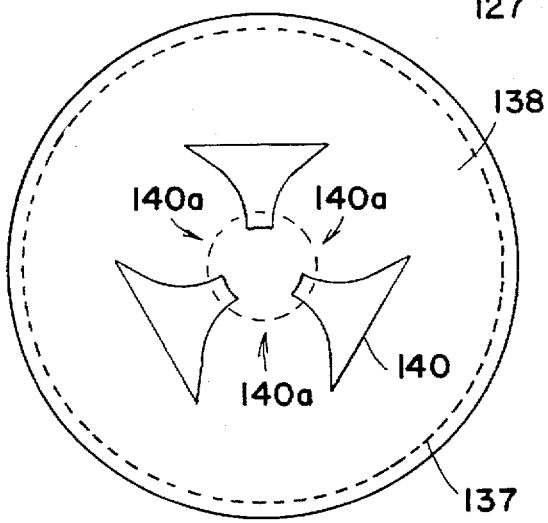   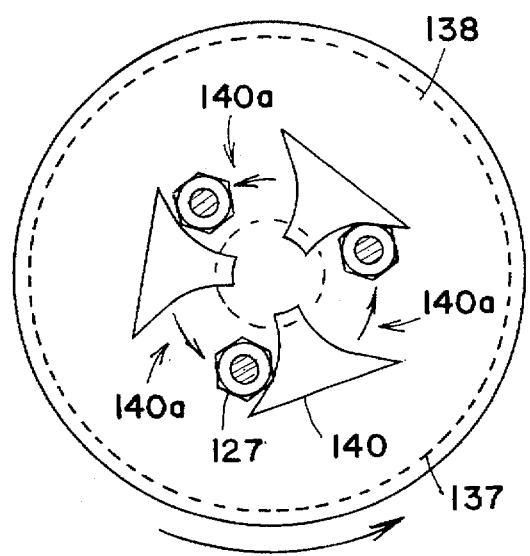
FIG. 17   FIG. 18

GENERATOR APPARATUS COUPLED TO SIDE FRAME OF VEHICLE AND ENERGIZED BY ROTATION OF AXLE ON VEHICLE

FIELD OF THE INVENTION

This invention relates to generating electrical energy by an electrical generator driven by a rotating axle of a vehicle and, more particularly, to the coupling of an electrical generator mounted on a side frame or axle of a vehicle and driven by reason of relative rotational motion between the axle and the side frame.

BACKGROUND

The rotating axle of a moving vehicle, such as a railway car, has been used to drive an electrical generator for generating electrical power which is used, for example, for powering lighting on the vehicle while the vehicle is moving. As is well known, electrical voltage can be generated in conductors when a magnetic field is moved relative to the conductors fixed in position, or when the conductors are moved relative to a magnetic field fixed in position.

Most railway freight cars have two four-wheel trucks of a basic three-piece design consisting of a bolster having a central pivot on which the car body rests and two side frames which support the bolster, the brake beams and bearings for the axles of wheels which support the side frame. The bolster usually rests on springs located in each side frame. Accordingly, the car body can rotate with respect to the bolster and both the car body and the bolster can move up and down with respect to the side frames and hence, the wheel axles.

Also, in the past, railway freight cars themselves have not had electrical equipment requiring a source of electricity, but it has been proposed to provide electrically operable braking equipment on such cars which requires a reliable source of electrical power of relatively small capacity. Such source can be a battery pack which, of course, would require recharging, and it would not only be inconvenient, but also impractical, due to maintenance failures and oversight, to charge such battery packs on each car from externally of the cars.

Since the electrical braking equipment would normally be used only when the car is in motion, it also is possible that an electrical generator without a battery pack could supply the necessary electrical power, but such an electrical generator would have to be very reliable and provide the necessary electrical power when the car is moving slowly.

In addition, not only the electrical generator but also the drive for the generator must be reliable under the adverse conditions, i.e. heat, cold, snow, rain, slush, dirt, etc., which railway freight cars encounter, the trucks normally not being enclosed and being exposed to the ambient.

Preferably, also the generator and its drive should be easy to install without extensive modifications of parts of the car, e.g., the trucks, which must be approved by a standardizing agency, e.g. the American Association of American Railroads, and preferably, also, the generator and its drive should be easily installed on new freight cars and on freight cars already in the field.

Passenger cars have been equipped with electrical generators driven from a part of the car which rotates when the car is moving, e.g. an axle, for other than brake operating purposes, e.g. for operating lighting and other appliances. The generator drive may comprise a belt which may be sufficient for lighting, etc. purposes because loss of electrical power does not affect braking and hence, safety, but a belt is not a sufficiently reliable drive.

It has been proposed to mount an electrical generator on the truck bolster which interconnects the side frames of a vehicle. The generator drive comprises a rubber tire engaging the periphery or rim of a truck supporting wheel.

Obviously, the tire must be smaller in diameter than the diameter of the wheel which means that at high speeds of the wheel, the tire must rotate at higher speeds which can be too high for rotation of the generator rotor without damage. Thus, such apparatus must include rotational speed compensation apparatus which increases the size, complexity and cost of the apparatus and the difficulties of installation.

In addition, the rubber tire must be mounted so that it compensates for the movement between the bolster and the wheels which requires moving parts. Such moving parts, as well as the tire, wear which limits the life of the apparatus to a relatively short life.

Accordingly, there is a need for an electrical generator and drive assembly which overcomes the disadvantages of the proposals and prior art described hereinbefore.

BRIEF SUMMARY OF THE INVENTION

In accordance with a preferred embodiment of the present invention, an electrical generator is coupled to a side frame of a vehicle receiving a rotatable axle so that the generator is in a fixed position with respect to the axle. The rotor of the generator has permanent magnets which are coupled to the axle so that they rotate with the axle.

Thus, the rotor rotates at the same speed as the axle, and a commutator for delivering the electrical output of the generator and compensation for the speed of rotation of the car wheel are unnecessary. The rotor is encircled by conductors which are mounted in a fixed position, or a substantially fixed position, with respect to the side frame so that there is substantially no movement of the encircling conductors with respect to the side frame. Except for devices which permit small movement of the axle transversely to the axis of the rotor in one embodiment or which permit small rotation of the conductors with respect to the axle in another embodiment, there are no moving parts in the drive.

In one embodiment of the invention, the conductors are maintained in coaxial relation with the axle and the rotor by mounting them in fixed coaxial relation with the axle and limiting rotation of the conductors by means of a drag link pivotally secured at one end to a generator housing, which contains the conductors and the rotor, and pivotally secured at the opposite end to the side frame. Such drag link permits movement of the side frame with respect to the axle without disturbing the coaxial relation of the conductors and the rotor.

Although not preferred, the drag link can be replaced by other means, such as a counterweight on the generator housing or a friction brake engaging the generator housing, which is sufficient to prevent rotation of the generator housing and the conductors with the rotor.

In a further embodiment, the rotor and conductors of the generator are mounted in fixed relation to the side frame and in nominally coaxial relation with the axle. However, the drive apparatus which interconnects the axle with the rotor permits movement of the axis of the axle with respect to axis of the rotor due to any movement of the axis of the axle with respect to the side frame and permits limited rotation of the axle with respect to the rotor.

BRIEF DESCRIPTION OF THE DRAWINGS

Other objects and advantages of the present invention will be apparent from the following detailed description of the presently preferred embodiments, which description should be considered in conjunction with the accompanying drawings in which:

FIG. 1 is an end elevation view of an embodiment of the invention in which an electrical generator has a rotor and conductors mounted coaxial with an axle of railway car truck, the rotor being rotatable by the axle and rotation of the conductors being limited by a drag link pivotally coupled, at one end, to the truck side frame and at the opposite end, to a generator housing containing the conductors;

FIG. 2 is an end elevation view of an alternative exemplary embodiment of the axle-mounted generator assembly of FIG. 1 in which the generator housing is coupled to a bearing adapter which is mounted on the side frame of a railway car;

FIG. 14 is an end view of the generator housing as viewed in the direction of the arrows 14—14 indicated in FIG. 13;

FIG. 15 is an end view of the conductor carrying stator with a portion of the rotor as viewed in the direction of the arrows 15—15 indicated in FIG. 13;

FIG. 16 is an end view of the modified axle end face as viewed in the direction of the arrows 16—16 indicated in FIG. 13;

FIG. 17 is an end view of the rotor drive as viewed in the direction of the arrows 17—17 indicated in FIG. 13;

FIG. 18 is a modified view of FIG. 17 showing the rotational relation between heads of bolts fixed to the axle and projections from the drive assembly of the electric generator of FIG. 10 in accordance with the present inventive technique.

Although a railway car may have more than one electrical generator assembly driven by a rotatable axle for generating electrical current and although the electrical generator assembly has application for generating electric current on other vehicles having rotatable axles, the invention will be described in connection with one axle of a conventional railway freight car axle, the application of the invention to other rotatable axles being apparent to those skilled in the art.

DETAILED DESCRIPTION

FIGS. 1 and 3–8 illustrate embodiments of an electric generator assembly 10 which can be coupled to an axle of a railway car, in accordance with the present invention, for generating electrical energy in response to rotation of an axle of the car. The generator assembly 10 is secured to the axle 17 to provide that the components in the generator assembly 10 move radially and axially in substantial correspondence with any such movement of the axle which may occur while the car is traveling. The non-rotatable components of the assembly 10 are coupled to a side frame 13 of the car to limit rotation thereof.

Figure 3:
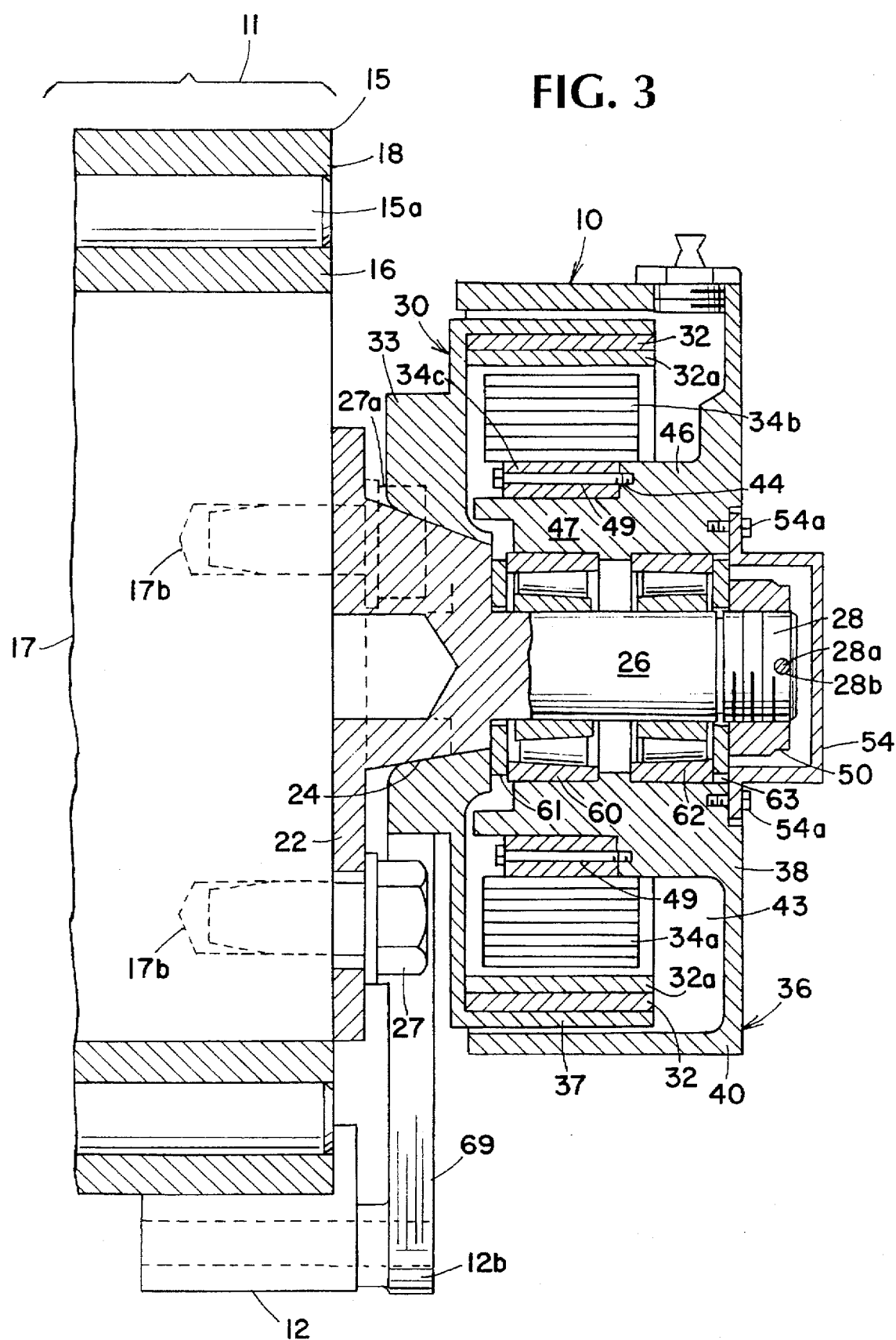
FIG. 3 is a transverse sectional view taken along the line 3—3 of FIG. 1.
Figure 4:
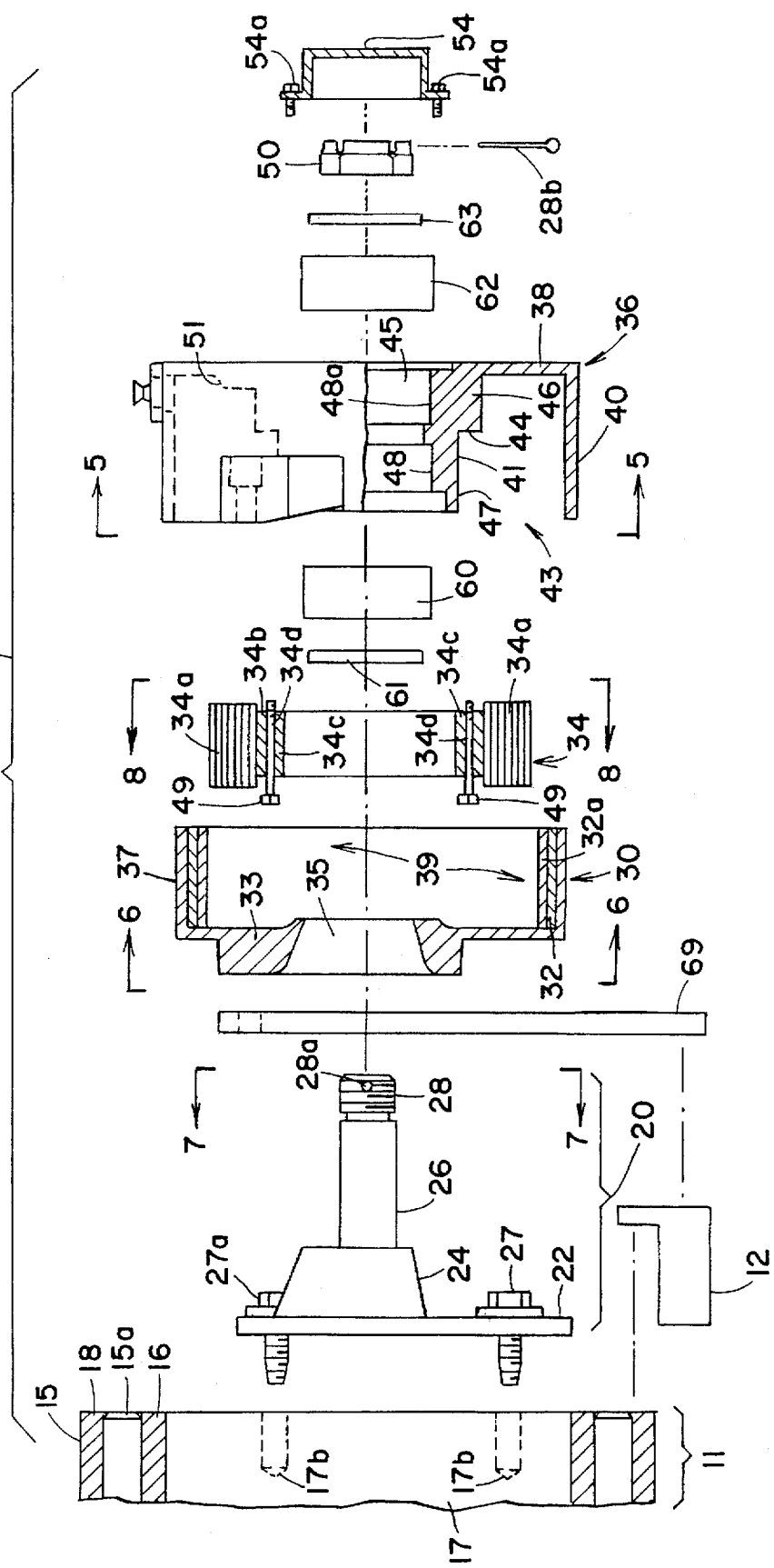
FIG. 4 is a fragmentary, exploded view of the components shown in FIG. 3.

Referring to FIGS. 1, 3 and 4, the generator assembly 10 is attached to the axle of a conventional axle assembly 11 which is only partially shown and which can be easily modified as described hereinafter, in accordance with the present inventive technique.

Figure 9:
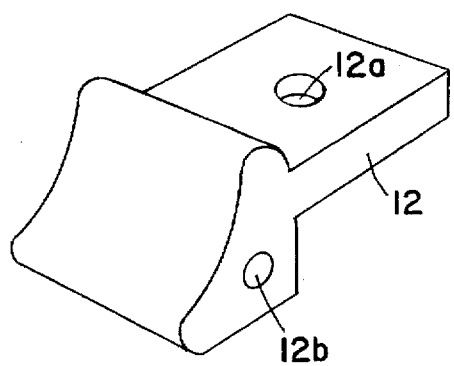
FIG. 9 is a perspective view of the bearing retainer included in the assembly of FIG. 1.

The axle assembly 11 comprises a bearing retainer 12 secured to the side frame 13 and a cylindrical axle roller bearing 15. The axle bearing 15 includes an inner race 16 and outer race 18 and rollers 15a. The bearing retainer 12 is rigidly connected to the side frame 13 at a connection point 12a. As shown in FIG. 9, the conventional bearing retainer 12 is modified to include a hole 12b for receiving a drag link pivot pin or bolt for the drag link 69.

Referring to FIG. 1, the conventional side frame 13 includes flanges 19, and the axle bearing 15 is received therebetween. The inner race 16 of the axle bearing 15 is press fit on the axle 17 and rotates with the axle 17 whereas the outer race 18 is engaged by the flanges 19 of the side frame 13 and is stationary. The bearing retainer 12 serves the usual purpose of retaining the bearing 15 with respect to axial movement.

FIG. 1 illustrates only one wheel 17a of a conventional car truck and is secured to the axle 17 near one end of the axle, so that when the wheel 17a rotates, the axle 17 also rotates. A similar wheel is similarly secured to the axle 17 near its opposite end which is similarly received in a bearing received between flanges of another side frame of the truck. Usually, the car truck has two such axles and four such wheels, and such axles and wheels support the side frames and hence, the bolster spring mounted on the frames.

FIG. 1 also illustrates known braking apparatus, but since the braking apparatus is not part of the invention, it is not further described herein.

Figure 7:
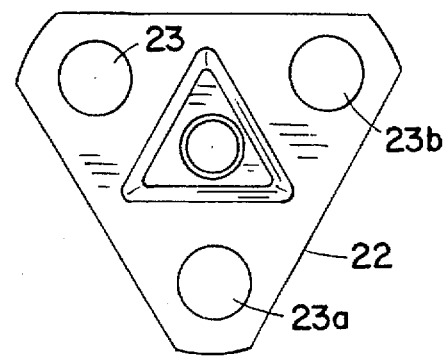
FIG. 7 is an end view of the drive draft assembly as viewed in the direction of arrows 7—7 indicated in FIG. 4.

Referring to FIGS. 3 and 4, the generator assembly 10 comprises a drive shaft assembly 20, a rotor 30 and a generator housing 36. The shaft assembly 20 comprises a vertical plate portion 22, a tapered non-circular portion 24, e.g. triangular, and a stub shaft 26. As shown in FIG. 7, the plate portion 22 preferably includes three holes 23, 23a and 23b. In accordance with the present invention, the axle 17 is provided at its end face with three corresponding threaded holes 17b and three bolts, only bolts 27 and 27a and their respective threaded holes being shown in FIG. 3 and 4, which are inserted through the holes 23, 23a and 23b and threaded into the threaded holes 17b in the axle 17 for rigidly securing the shaft assembly 20 to the axle 17.

The stub shaft 26 extends away from the axle 17 and terminates in a threaded end 28 which includes a cotter pin opening 28a for receiving a cotter pin 28b and receives a securing, castellated nut 50.

Figure 6:
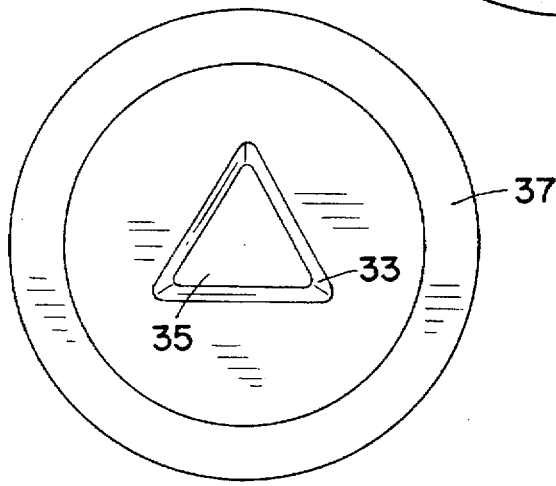
FIG. 6 is an end view of the generator rotor as viewed in the direction of arrows 6—6 indicated in FIG. 4.

Referring to FIGS. 4 and 6, the rotor 30 includes a wall 33 defining a tapered bore 35, for receiving the portion 24 of the shaft assembly 20. The rotor 30 further includes a hollowed out, internal drum region 39 that is bounded circumferentially by a wall 37 integral with the wall 33.

The rotor 30 also includes a ring 32 of magnetic material with a series, e.g. six, magnetized bars 32a secured to the ring 32 in any conventional manner, or which is a single ring of magnetized material with alternately polarized areas, the bars 32a being omitted. The ring 32 is press fit within the wall 37 of the drive assembly 30, as shown in FIGS. 4 and 8.

Figure 5:
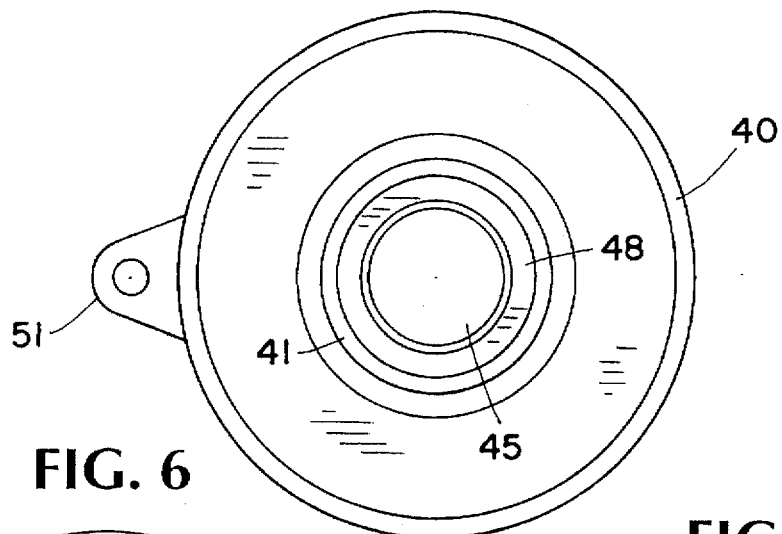
FIG. 5 is an end view of the generator housing as viewed in the direction of arrows 5—5 indicated in FIG. 4.

Referring to FIGS. 3, 4 and 5, the generator housing 36 comprises a vertical outer wall 38 and a circumferential wall 40 which extends toward the axle 17. The wall 40 has an inner diameter that is slightly greater than the outer diameter of the wall 37 of the rotor 30. A raised boss 41 extends away from the wall 38 and toward the axle 17. The boss 41 includes outer and inner stepped-down portions 47 and 46, respectively, and bearing receiving surfaces 48 and 48a, all of which, in sequence, extend from the outer surface of the boss 41 to the wall 38. The housing 36 has a bore 45 which extends through the boss 41 and the wall 38 of the generator housing 36. The inner surfaces of the walls 38 and 40 and the outer surfaces of the boss 41 define an inner region 43 in the generator housing 36.

Figure 8:
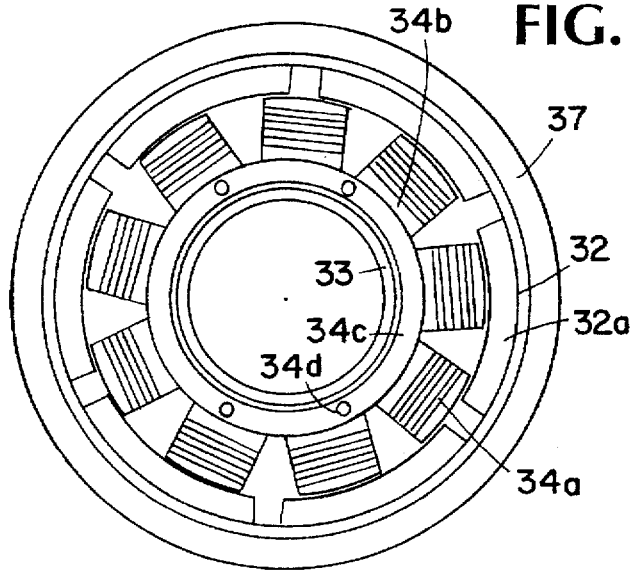
FIG. 8 is an end view of the conductor carrying stator with the rotor as viewed in the direction of arrows 8—8 indicated in FIG. 4.

With reference to FIGS. 3, 4 and 8, the stator 34, having conductors or coils 34a encircling poles 34b of magnetic material extending from a ring 34c of magnetic material, is secured to the boss portion 46 of the housing 36 by bolts 49. A tab 51 extends from the wall 40 of the generator housing 36. As explained in further detail below in connection with FIGS. 1 and 2, one end of a drag link 69 is pivotally secured to the tab 51 of the generator housing 36 and the other end is pivotally secured to the side frame 13 which is in fixed relation to the side frame 13 for restraining rotation of the housing 36.

As shown in FIGS. 3 and 8, the stator 34 has an outer diameter that is less than the inner diameter of the magnet ring 32 and an inner diameter that is greater than the outer diameter of the portion 47 of the boss 41. The ring 34c of the stator 34 comprises holes 34d which align with threaded holes 44 in the boss portion 46. Bolts 49 extend through the holes 34d of the ring 34c and are threaded into the holes 44 of the portion 46 to rigidly secure the stator 34 to the housing 36 within the inner region 43 of the generator housing 36.

The generator assembly 10 further comprises a pair of tapered roller bearings 60 and 62, a pair of washers 61 and 63, the fastening nut 50, the cotter pin 28b and a cap 54. The bearings 60 and 62 engage the surfaces 48 and 48a of the boss 41.

The generator assembly 10 can be assembled with the side frame 13 and the axle 17 as follows:

(1) The threaded holes 17b for receiving the bolts 27, 27a and the third bolt (not shown) are drilled and tapped in the end face of the axle 17;
(2) The shaft assembly 20 is secured to the axle 17 by the bolts 27 etc.;
(3) The rotor 30 with the ring 32 with the magnets 32a therein is slipped over the shaft 26 until the surfaces of the tapered bore 35 engage the surfaces of the portion 24;
(4) The washer 61 is placed over the shaft 26 and in engagement with the portion 24 and the rotor 30;
(5) The housing 36 with the stator 34 secured thereto by the bolts 49 and the bearings 60 and 62 therein is placed over the shaft 26;
(6) The washer 63 is placed over the shaft 26 and in engagement with the bearing 62, and the castellated nut 50 is threaded on the threaded end 28 of the shaft 26, the amount of torque being insufficient to prevent free rotation of the housing 36 relative to the rotor 30, and is secured in place by the cotter pin 28b;
(7) The cap 54 is secured to the housing 36 by bolts 54a; and
(8) The link 69 is pivotally secured at one end to the tab 51 and at the opposite end to the bearing retainer 12.

It will be observed from FIG. 3 that the components of the generator 10 are within a substantially sealed housing 36, and the drive for the rotor 30 is a shaft assembly 20 rigidly secured to the axle 17. Thus, the drive itself has parts which merely rotate with the axle 17 and is subject to little wear. While a portion of the shaft assembly 26 and one face of the rotor 30 are exposed to the ambient, such portion and face will be little affected by the conditions to which a railway car is exposed. If desired, a flexible sealing strip can be mounted between the wall 40 and the periphery of the rotor 30, the strip having sliding engagement with one or the other.

Because the generator assembly 10 is mounted on the axle 17, the generator assembly 10 follows any movement of the axle 17 transverse to or axially of the axis of the axle 17. The rotor 30 and the stator 34 are maintained in fixed relation, except for relative rotation, by the bearings 60 and 62 and the nut 50. Although the housing 36 and the stator 34 are prevented from rotating with respect to the rotor 30 by the drag link 69 which is pivotally secured at one end to the retainer 12, and hence, the side frame 13, and at the other end, to the housing 36, any relative movement of the axle and the side frame transversely to the axis of the axle 17 does not affect the position of the generator assembly 10 with respect to the axle 17.

When the axle 17 rotates, the rotor 30 is rotated causing an electrical current to be induced in the coils 34a which can be interconnected and connected externally of the housing 36 by wires (not shown) in any conventional manner. However, no commutator or slip rings are required.

In some installations, a known adapter for the axle bearing is employed. FIG. 2 shows an alternative embodiment of the coupling of generator housing 36 to the side frame 13 using the drag link 69. Referring to FIG. 2, the axle assembly 11 includes a bearing adapter 80 held in the side frame 13. The generator assembly 10 is mounted on the axle 17 as previously described, and the end of the drag link 69 opposite the end connected to the generator housing 36 is pivotally secured at the link connection 83 on the bearing adapter 80. This connection to the bearing adapter 80 serves the same function as the connection of the drag link 69 to the bearing retainer 12, namely, the housing 36 and the parts secured thereto are restrained with respect to rotation with the rotor 30.

Other ways of limiting rotation of the housing 36 with the rotor 30 will be apparent to those skilled in the art. With a low power generator, the forces tending to cause rotation of the housing 36 with the rotor 30 are small, and therefore, in some cases, the drag link 69 and its connections can be omitted and a counterweight 82 can be secured to the bottom of the housing 36 as shown in FIG. 2. The counterweight would be of a weight sufficient to limit rotation of the housing 36 with rotation of the rotor 30 to a small value. Such counterweight 82 can also be used in place of the drag link 69 shown in the embodiment of FIG. 1.

Also, the housing 36 can be engaged by a friction brake (not shown) which is secured to the side frame 13 and which has limited movement so that the housing 36 is permitted limited movement with respect to the side frame 13.

FIGS. 10–18 illustrate another embodiment of an electrical generator assembly 100 which may be coupled to the side frame 13, in accordance with the present invention, for generating electrical current based on rotation of the axle 17. The embodiment shown in FIGS. 10–18 mainly differs from the embodiments shown in FIGS. 1–9 in that the generator assembly is mounted on the side frame and the rotor is coupled to the end of the axle 17 by a drive which permits limited movement of the axle 17 with respect to the rotor shaft. For ease in reference, components included in the assembly 100 which are the same as the components hereinbefore described are designated with the same reference numerals.

Figure 10:
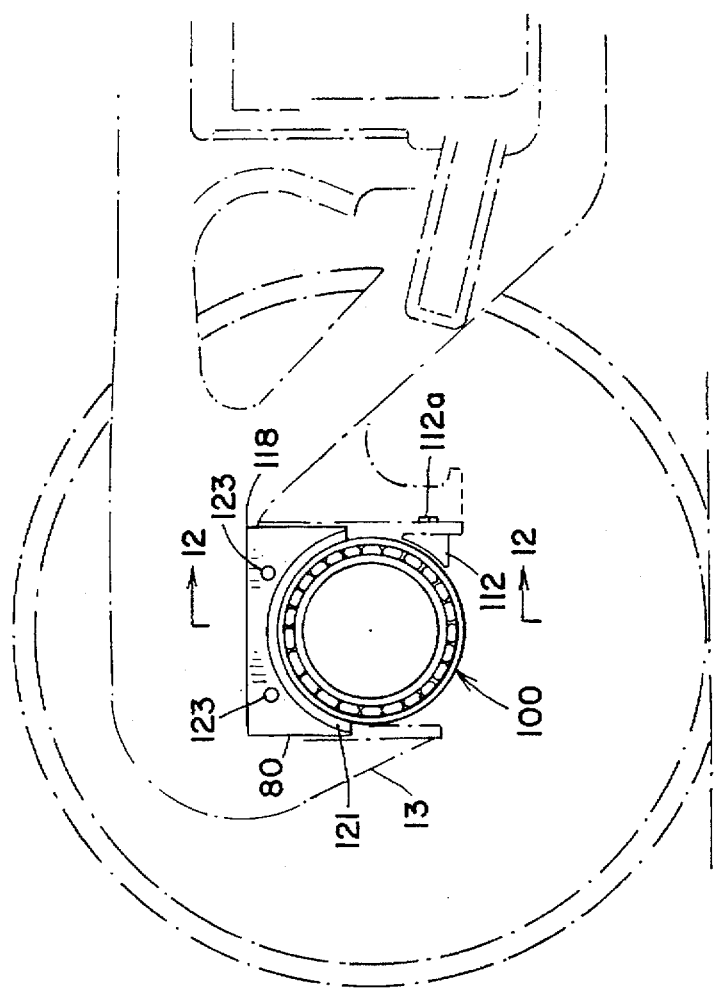
FIG. 10 is an end elevation view of an alternative embodiment of the invention in which the generator assembly is not rigidly coupled to the car axle.
Figure 11:
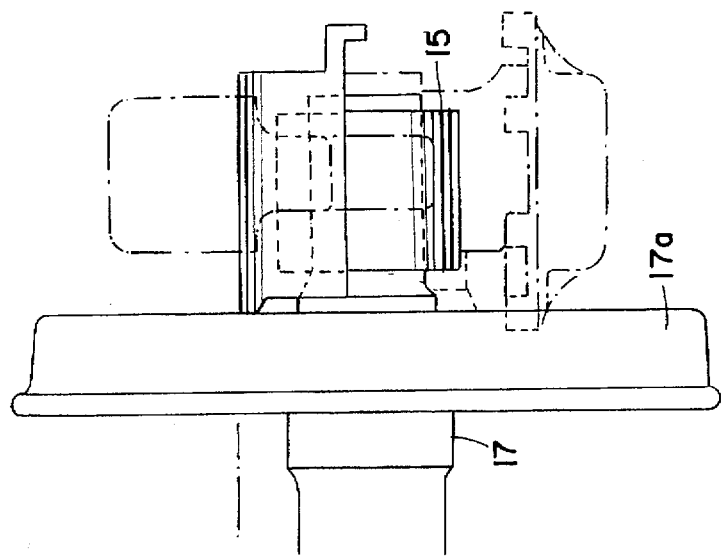
FIG. 11 is an end elevation view of a portion of a railway car truck with a known type of bearing adapter.
Figure 12:
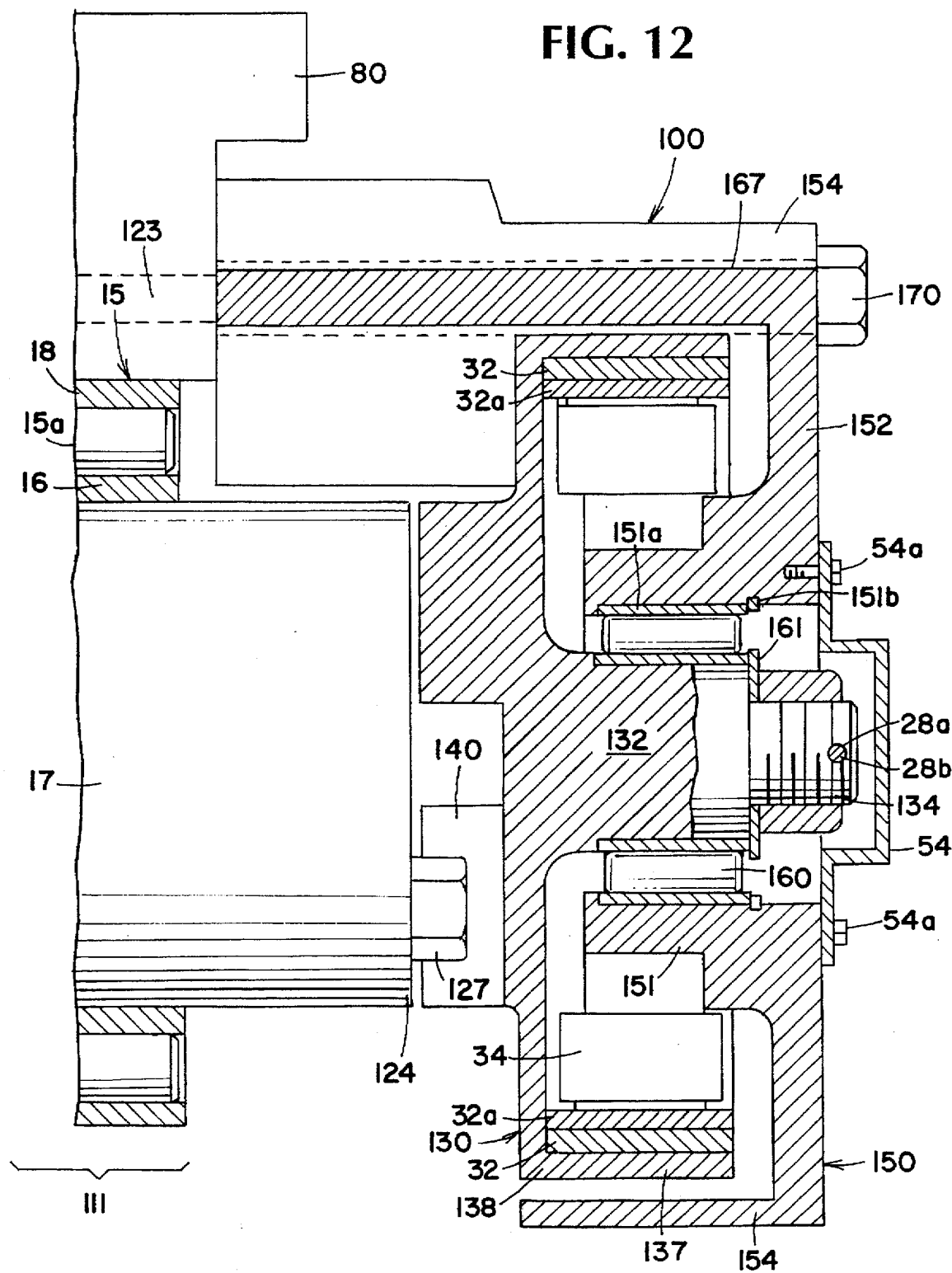
FIG. 12 is a transverse sectional view taken along the line 12—12 of FIG. 10.
Figure 13:
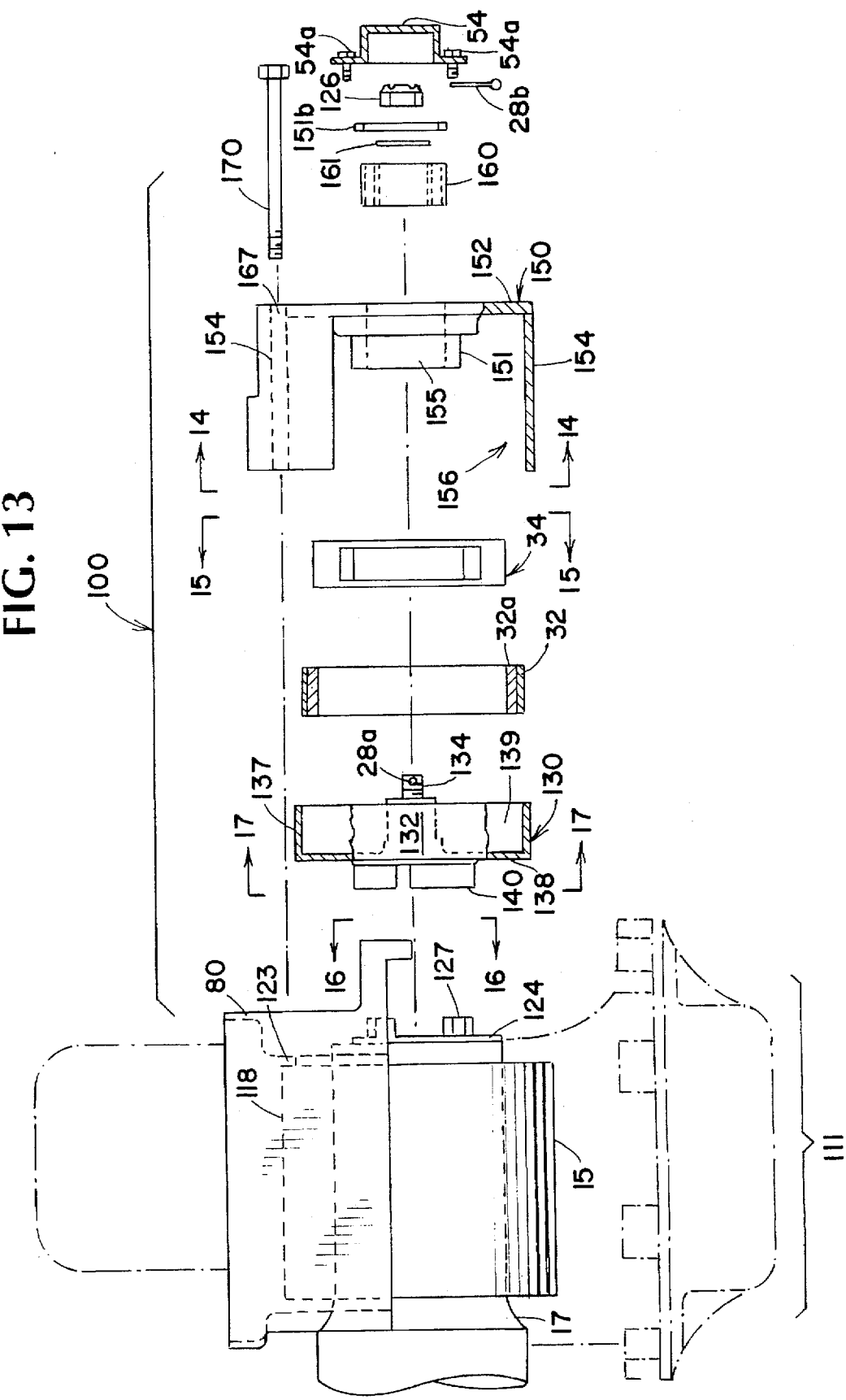
FIG. 13 is an exploded view of the components shown in FIG. 12 in association with the portion of the railway car truck shown in FIG. 11.

Referring to FIGS. 10 and 12–13, the generator assembly 100 is coupled to the side frame 13 of the railway car with its rotor and stator substantially coaxial with the axle 17 of axle assembly 111. The axle assembly 111 is a known assembly comprising a bearing retainer 112, a bearing adapter 80, such as the A.A.R. adapter, Standard S-704-69, an axle bearing 15 and an axle 17. The bearing retainer 112 is rigidly connected to the side frame 13 at the connection point 112a. The bearing adapter 80, the axle bearing 15 and the axle 17 are received within the side frame 13, as described in detail above in connection with FIG. 2. The bearing adapter 80 is modified to include two threaded holes 123.

The axle assembly 111 also comprises, preferably, a bearing cap 124 although such cap 124 can be omitted. As shown in FIG. 16, the bearing cap 124 has three bolts 127, extending therethrough. In accordance with the present invention, the end of the axle 17 is modified to include threaded holes, e.g. three, which receive the bolts 127, or drive members, securing the bearing cap 124 to the axle 17. The number of holes in the cap 124 and of the bolts can be greater or lesser in number but not less than two, in order to hold the cap 124 in place.

Referring to FIGS. 12 and 13, the generator assembly 100 comprises a drive and rotor assembly 130 and a generator housing 150. The drive assembly 130 comprises a vertical wall 138 and a circumferential wall 137 which extends away from the axle 17. The walls 137 and 138 define a hollowed out, internal drum region 139 in the drive assembly 130 which includes the ring 32 of magnetized material or magnets 32a described in connection with FIGS. 3 and 4. A stub shaft 132 is integral with and extends away from the wall 138 and terminates at a threaded end 134, which receives a castellated nut 126 and a cotter pin 28b at the cotter pin opening 28a.

The drive assembly 130 further includes a pattern of substantially triangular-shaped projections, or driven members, 140, as shown in FIG. 17, on the side of the wall 138 facing the axle 17. The number of the projections 140 is equal to the number of bolts 127 and are arranged so that the heads of the bolts 127 are received therebetween as shown in FIG. 18. Also, the heads of the bolts 127 are spaced from the wall 138. As explained hereinafter, this arrangement permits the drive assembly 130 to be rotatably driven relative to the stator 34 and also prevents damage to the parts of the assembly 100. It will be observed that the heads of the bolts 127 have side surfaces spaced from the axis of the axle 17 and have dimensions in the direction circumferentially of the axis of the axle 17 which are small relative to the circumferential dimension of the axle 17. It also will be observed that the dimensions of the projections 140 in the direction circumferentially of the axis of the axle 17 are smaller than said circumferential dimension of said axle 17. Accordingly, there can be limited rotation of the axle 17 with respect to the drive assembly 130.

Referring to FIGS. 12, 13 and 14, the generator housing 150 comprises a vertical outer wall 152 and a circumferential wall 154 that extends toward the axle 17. The wall 154 has an inner diameter that is slightly larger than the outer diameter of the wall 137 of the drive assembly 130. The walls 152 and 154 and a raised boss 151 define an inner region 156 in the generator housing 150. The boss 151 has a bore 155 for receiving a roller bearing 160 which is held in place by a ridge 151a on the boss 151 and a split retaining ring 151b.

The generator housing 150 has holes 167 which extend through walls 152 and 154 which are coaxial with tapped holes 123 in the bearing adapter 80.

The generator assembly 100 also comprises a stator 34, which can be press fit on the boss 151 or secured to the housing 150 as described in connection with FIG. 3. In addition, the generator assembly 100, preferably, comprises a washer 161, a fastening nut 126 and a cap 54.

The generator assembly 100 can be installed on the railway car as follows:

(1) Holes for the bolts 127 are drilled in the end face of the axle 17 and threaded and the plate 124 is secured to the end face of the axle 17 and the threaded holes 123 are formed in the adapter 80.

(2) The components of the assembly 100 are assembled, e.g. the bearing 160 is placed on the boss 151 and secured in place by the retaining ring 151b, the stator 34 is secured to the housing 150, either by press fitting it on the boss 151 or by bolts as shown in FIG. 3, the shaft 132 is inserted through the bearing 160, the washer 161 is put in place and the nut 126 is threaded on the threaded portion 134, the nut 126 being tightened sufficiently to hold the drive assembly 130 in place without looseness but not so much that the drive assembly will not rotate freely with respect to the stator 34, and the cotter pin 28b is inserted in the hole 28a in the threaded portion 134;

(3) The axis of the shaft 132 is aligned with the axis of the axle 17 with the projections 140 facing the axle 17 and intermediate the heads of the bolts 127 and the housing 150 is pushed toward the adapter 80 and the holes 167 for bolts 170 are aligned with the tapped holes 123 in the adapter 80. The bolts 170 are inserted and turned into the holes 123 until the housing 150 is securely fastened to the adapter 80; and (4) The cap 54 is secured to the housing 150 by the bolts 54a.

With the embodiment shown in FIGS. 10–18, there can be movement of the axle 17 transversely to its axis and hence, with respect to the side frame to which the generator assembly 100 is secured. Such movement could cause damage to the components of the assembly 100 if the drive assembly 130 were rigidly secured to the axle 17. However, with such embodiment shown in FIGS. 10–18, the drive assembly 130 is not rigidly attached to the axle 17, and none of its components engage the axle 17, or parts secured thereto, except the projections 140 which are spaced from the end face of the axle 17 and have spaces 140a (see FIGS. 17 and 18) which are larger than the heads of the bolts 127 and permit a small amount of rotation of the axle 17 with respect to the projections 140. Also, the heads of the bolts 127 have only frictional engagement with the surfaces of the projections 140. Accordingly, movement of the axle 17 transversely to its axis does not apply significant forces to the drive assembly 130.

While coupling of the drive assembly 130 to the axle 17 by the bolts 127 and the projections 140 is a simple way to cause rotation of the drive assembly 130 with the axle 17 and requires only a modification of the axle 17 which is easily accomplished, it will be apparent to those skilled in the art that the coupling can be of other forms. In effect, the heads of the bolts 127, which can be fewer or greater in number than three, form a non-circular member which is loosely received between the projections 140 having a pattern, matching the pattern of the bolt heads.

For example, the bolts 127 can be used to mount a cap 124 from which a pin or pins extend and which are engageable with one or more projections 140. Also, the bolts 127 can be used to mount a plate from which a non-circular member extends and which is loosely received in a tubular member mounted on the wall 138 in place of the projections 140, the tubular member having a bore matching the shape of the non-circular member but which permits limited axial and rotational movement of the axle 17 with respect to the shaft 132.

The electrical generator 100 generates electrical current in the stator 34 as follows. When the car is moving, the axle 17 rotates and causes the heads of the bolts 127 to revolve around the axis of the axle 17. The side surfaces of the heads of the bolts 127 engage the projections 140, as shown in FIG. 18, and cause the drive assembly 130 and the magnetized material or magnets 32 contained therein to revolve around the axis of the shaft 132. Consequently, electrical energy will be generated in the conductors 34b, which are held stationary, by the generator housing 150 which is secured to the stationary bearing adapter 80, and hence, to the side frame 13, by the bolts 170.

Figure 19:
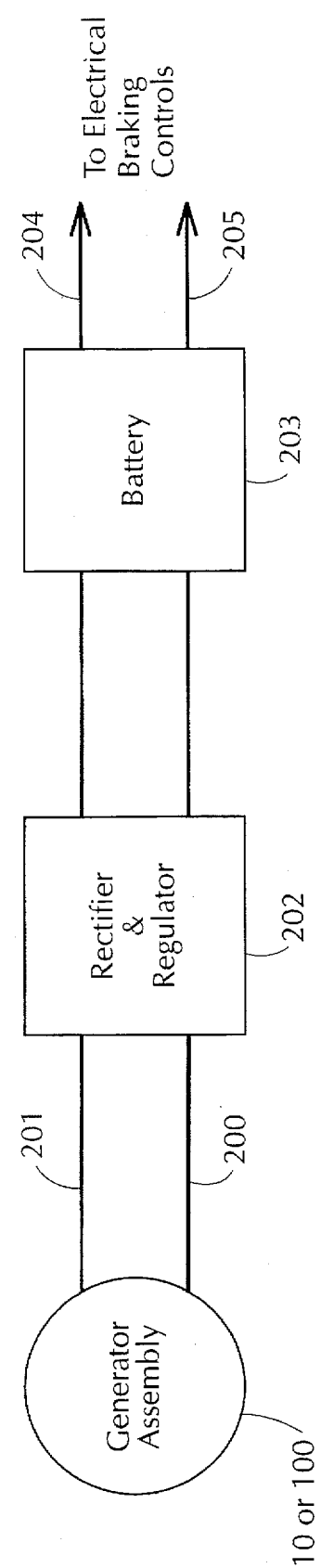
FIG. 19 is a simplified, schematic block diagram illustrating a use of the generator of the generator assembly.

FIG. 19 is a schematic block diagram schematically illustrating the electrical connection of the generator field windings 34a to the electrical braking controls of a vehicle. The generator assembly 10 or 100 will, of course, produce alternating current, and while the field windings could be connected directly to the electrical braking controls if they will accept alternating current of varying amplitude and frequency, normally, the output of the field windings 34a will have to be rectified and controlled in amplitude for such use. Thus, the field windings 34a can be connected by leads 200 and 201 to a conventional rectifier and voltage regulator 202, the output of which can be fed to a battery 203 for charging purposes. The battery 203 will supply a substantially constant direct current voltage to the electrical braking controls, or other devices on the vehicle, by way of leads 204 and 205.

Although preferred embodiments of the present invention have been described and illustrated, it will be apparent to those skilled in the art that various modifications may be made without departing from the principles of the invention.

I claim:

1. Electrical generator apparatus for a vehicle having rotatable supporting wheels mounted on an axle having an axis of rotation and having an end face, said vehicle having a non-rotatable portion supported by said axle, said apparatus comprising:

an electrical generator comprising a rotor having an axis of rotation and having magnetic field producing means, and a stator with conductors disposed in a circle and coaxial with said axis of said rotor, said conductors being in said magnetic field;

coupling means for coupling said stator to said portion of said vehicle and preventing rotation of said stator with said axle;

mounting means for mounting said rotor and said stator coaxial with said axis of rotation of said axle and adjacent said end face of said axle; and drive means for interconnecting said axle and said rotor for causing rotation of said rotor with said axle, said rotor being rotatable with respect to said axle in the absence of said drive means and said drive means comprising a first drive member and a second drive member separable from each other in the direction of said axis of said axle, one of said first drive member and said second drive member being securable to said end face of said axle at a position on said end face spaced radially of said axis of said axle and the other of said first drive member and said second drive member being secured to said rotor at a position thereon spaced radially from said axis of said rotor and being engagable with said one of s aid first drive member and said second drive member with rotation of said axle for causing rotation of said rotor with said axle .

2. Apparatus as set forth in claim 1 wherein said drive means comprises a rotatable drive shaft having an axis of rotation and securing means for securing an end of said shaft to said axle and with the axis of said shaft coaxial with said axis of said axle.

3. Apparatus as set forth in claim 2 wherein said mounting means comprises rotor mounting means rotatable mounting said rotor on said shaft and wherein said one of said first and second drive means is formed by a non-circular portion of said shaft and said other of said first and second drive means is formed by the wall of a non-circular bore in said rotor mounting means which receives said non-circular portion of said shaft, whereby said shaft rotates said rotor with rotation of said shaft, and stator mounting means mounting said stator on said shaft, said stator mounting means permitting rotation of said shaft with respect to said stator.

4. Apparatus as set forth in claim 3 wherein said coupling means comprises means for interconnecting said stator mounting means and said portion of said vehicle for limiting rotation of said stator mounting means with respect to said shaft.

5. Apparatus as set forth in claim 1 wherein said mounting means comprises a rotatable shaft with an axis of rotation and having a projecting member thereon forming said other of said first drive member and said second drive member engageable with said one drive member for causing rotation of said shaft with said axle and wherein said rotor and said stator are mounted on said shaft coaxial with said axis of rotation of said shaft.

6. Apparatus as set forth in claim 5 wherein said projecting member extends toward said axle, when said rotor and said stator are mounted coaxially with said axis of said axle and said one drive member comprises a member which extends from said axle toward said shaft.

7. An electrical generator assembly mounted on a vehicle having a rotatable axle with an end face and an axis of rotation and supported by wheels and having a portion supported by said axle and in a substantially fixed position with respect to said axle, said generator assembly comprising:

a rotor having an axis of rotation and with magnetic field producing means, said rotor being mounted with said axis of rotation of said rotor coaxial with the axis of said axle;

a stator with conductors disposed in a circle having its center at said axis of rotation of said rotor and disposed in said magnetic field;

coupling m means coupling said rotor to said axle for rotating said rotor with said axle, said rotor being rotatable with respect to said axle in the absence of said coupling means, said coupling means comprising a first drive member and a second drive member separable from each other in the direction of said axis of said axle, one of said first drive member and said second drive member being secured to said end face of said axle at a position on said end face spaced radially of said axis of said axle and the other of said first drive member and said second drive member being secured to said rotor at a position thereon spaced radially from said axis of said rotor and being engageable with said one of said first drive member and said second drive member with rotation of said axle for causing rotation of said rotor with said axle; and rotation limiting means connected between said stator and said portion of said vehicle for limiting rotation of said stator with respect to said rotor.

8. The assembly of claim 7 wherein said magnetic field producing means comprises a ring of magnetic material.

9. The assembly of claim 8 wherein said ring further comprises a series of magnets mounted therein.

10. The assembly of claim 7 wherein said coupling means comprises a rotatable drive shaft having an axis of rotation and securing means securing an end of said shaft to said axle and with the axis of said shaft coaxial with said axis of said axle.

11. The assembly of claim 7 wherein said rotation limiting means comprises a drag link, said drag link having a first end pivotally coupled to said stator and a second end pivotally coupled to said portion of said vehicle.

12. The assembly of claim 11, wherein there is a bearing intermediate said portion of said vehicle and said axle and a bearing retainer coupled to said portion of said vehicle for retaining said bearing in position and wherein said second end of the drag link is pivotally secured to said bearing retainer.

13. The assembly of claim 11, wherein there is a bearing intermediate said rotatable axle and said portion of said vehicle and a bearing adapter intermediate said bearing and said portion of said vehicle and coupled to said bearing, and wherein said second end of said drag link is pivotally secured to said bearing adapter.

14. The assembly of claim 7, wherein said one drive member is a projecting member on said axle spaced from said axis of said axle and said coupling means comprises a rotatable drive shaft with an axis of rotation coaxial with said axis of said axle, said drive shaft having said other drive member therein and engageable with said projecting member for causing rotation of said shafat with said axle and wherein said rotor and said stator are mounted on said shaft coaxial with said axis of rotation of said shaft.

15. The assembly of claim 7 wherein said rotation limiting means comprises a housing covering said stator, said stator being secured to said housing and said housing being secured to said portion of said vehicle.

16. A railway car and an axle driven electrical generator assembly, said railway car comprising:

a truck with at least one side frame supported by wheels on at least one rotatable axle, said axle having an end face and an axis of rotation and said axle being connected to said side frame by a bearing intermediate said side frame and said axle;

said electrical generator comprising:

a rotatable rotor with an axis of rotation and having magnetic field producing means;

a stator with conductors mounted in the magnetic field of said magnetic field producing means; and a housing at least partially enclosing said rotor and said stator and secured to said stator; and said assembly further comprising:

mounting means mounting said electrical generator on one of said axle and said side frame with said axis of said rotor coaxial with said axis of said axle; and drive means interconnecting said axle with said rotor for causing rotation of said rotor with said axle, said rotor being rotatable with respect to said axle in the absence of said drive means, said drive means comprising a first drive member and a second drive member separable from each other in the direction of said axis of said axle, one of said first drive member and said second drive member being secured to said end face of said axle at a position on said end face spaced radially of said axis of said axle and the other of said first drive member and said second drive member being secured to said rotor at a position thereon spaced radially from said axis of said rotor and being engageable with said one of said first drive member and said second drive member with rotation of said axle for causing rotation of said rotor with said axle.

17. An assembly as set forth in claim 16 wherein said mounting means comprises securing means securing said housing to said side frame.

18. An assembly as set forth in claim 17 wherein said mounting means comprises a rotatable drive shaft having an axis of rotation, said rotor being rotatable mounted on said drive shaft and said axis of rotation of said drive shaft being coaxial with said axis of said axle, said drive shaft having an end face facing but spaced from said end face of said axle, said one drive member extending from said end face of said axle toward but spaced from said end face of said drive shaft, said drive shaft having said other drive member thereon for engaging said one drive member when said axle rotates to cause rotation of said drive shaft with said axle.

19. An assembly as set forth in claim 18 wherein said drive means permits limited rotation of said axle with respect to said drive shaft.

20. An assembly as set forth in claim 19 wherein said one drive member has a dimension in the direction circumferentially of said axle which is small relative to the circumferential dimension of said axle and said other drive member is a projection on said end face of said drive shaft extending toward but spaced from said end face of said axle and engageable with said one drive member with rotation of said axle, said projection having a dimension in the direction circumferentially of said axle which is smaller than the circumferential dimension of said axle.

21. An assembly as set forth in claim 16 wherein said mounting means comprises a rotatable drive shaft with an axis of rotation, said rotor being rotatably mounted on said drive shaft and said axis of said drive shaft being coaxial with said axis of said axle, securing means securing said drive shaft to said axle to cause rotation of said drive shaft with said axle, bearing means rotatably mounting said stator and said housing on said drive shaft for permitting said drive shaft to rotate with respect to said stator and said housing, and restraining means connected to said housing for limiting rotation of said housing with rotation of said drive shaft.

22. An assembly as set forth in claim 21 wherein said restraining means comprises interconnecting means including a drag link interconnecting said housing with said side frame.

23. Electrical generator apparatus for a vehicle having rotatable supporting wheels mounted on an axle having an axis of rotation, said vehicle having a non-rotatable portion supported by said axle, said apparatus comprising:

an electrical generator comprising a rotor having an axis of rotation and having magnetic field producing means, and a stator with conductors disposed in a circle and coaxial with said axis of said rotor, said conductors being in said magnetic field;

coupling means for coupling said generator to said portion of said vehicle;

mounting means for mounting said rotor and said stator coaxial with said axis of rotation of said axle; and drive means for interconnecting said axle and said rotor for causing rotation of said rotor with said axle, said drive means comprising a drive member securable to said axle in spaced relation to said axis of said axle, a rotatable shaft with an axis of rotation and having a projecting member thereon spaced from said axis of said shaft and engageable with said drive member for causing rotation of said shaft with said axle, said rotor and said stator being mounted on said shaft coaxial with said axis of rotation of said shaft and wherein said projecting member extends toward said axle, when said rotor and said stator are mounted coaxially with said axis of said axle and said drive member comprises a member which extends from said axle toward said shaft, when mounted on said axle.

24. A railway car and an axle driven electrical generator assembly, said railway car comprising:

a truck with at least one side frame supported by wheels on at least one rotatable axle, said axle having an axis of rotation and said axle being connected to said side frame by a bearing intermediate said side frame and said axle;

said electrical generator comprising:

a rotatable rotor with an axis of rotation and having magnetic field producing means;

a stator with conductors mounted in the magnetic field of said magnetic field producing means; and a housing at least partially enclosing said rotor and said stator and secured to said stator; and said assembly further comprising:

mounting means mounting said electrical generator on one of said axle and said side frame with said axis of said rotor coaxial with said axis of said axle, said mounting means comprising securing means securing said housing to said side frame; and drive means interconnecting said axle with said rotor for causing rotation of said rotor with said axle, said drive means comprising a rotatable drive shaft having an axis of rotation, said rotor being mounted on said drive shaft for rotation therewith and said axis of rotation of said drive shaft being coaxial with said axis of said axle, sa id drive shaft having an end face e and said axle having an end face facing but spaced from said end face of said drive shaft, a driving member extending from said end face of said axle toward but spaced from said end face of said drive shaft and said driving member having a surface spaced from said axis of said axle and said drive shaft having driving member engaging means for engaging said surface of said driving member when said axle rotates to cause rotation of said drive shaft with said axle; said driving member engaging means permitting limited rotation of said axle with respect to said drive shaft.

25. An assembly as set forth in claim 24 wherein said driving member has a dimension in the direction circumferentially of said axle which is small relative to the circumferential dimension of said axle and said driving member engaging means is a projection on said end face of said drive shaft extending toward but spaced from said end face of said axle and engageable with said surface of said driving member with rotation of said axle, said projection having a dimension in the direction circumferentially of said axle which is smaller than the circumferential dimension of said axle.

* * * * *

UNITED STATES PATENT AND TRADEMARK OFFICE
CERTIFICATE OF CORRECTION

PATENT NO. : 5,753,987
DATED : May 19, 1998
INVENTOR(S) : Shepherd et al

It is certified that error appears in the above-identified patent and that said Letters Patent is hereby corrected as shown below:

Col. 10, line 16, change "s aid" to --said--;

Col. 10, line 25, change "rotatable" to --rotatably--;

Col. 10, line 66, change "m means" to --means--;

Col. 12, line 31, change "rotatable" to --rotatably--;

Signed and Sealed this

Fifteenth Day of September, 1998

Attest:

BRUCE LEHMAN

*Attesting Officer*  *Commissioner of Patents and Trademarks*